United States Patent
Robie et al.

(10) Patent No.: US 6,291,008 B1
(45) Date of Patent: *Sep. 18, 2001

(54) R-T-E CEREAL AND METHOD OF PREPARATION

(75) Inventors: Steven C. Robie, Plymouth; David J. Hilgendorf, St. Louis Park, both of MN (US)

(73) Assignee: General Mills, Inc., Minneapolis, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/025,976

(22) Filed: Feb. 19, 1998

(51) Int. Cl.[7] ........................................ A23L 1/164
(52) U.S. Cl. ................ 426/620; 426/615; 426/621; 426/439; 426/441; 426/455; 426/517
(58) Field of Search .................. 426/620, 615, 426/621, 439, 441, 455, 517

(56) References Cited

U.S. PATENT DOCUMENTS

| | | |
|---|---|---|
| 2,707,153 | 4/1955 | Bettman . |
| 2,876,160 | 3/1959 | Schoch . |
| 3,054,677 | 9/1962 | Graham, Jr. et al. . |
| 3,868,471 | 2/1975 | Decelles et al. . |
| 3,903,308 | 9/1975 | Ode . |
| 3,998,978 | 12/1976 | Lawrence et al. .............. 426/285 |
| 4,178,392 | 12/1979 | Gobble et al. . |
| 4,211,800 | 7/1980 | Scharschmidt et al. . |
| 4,526,800 * | 7/1985 | Howard ................ 426/559 |
| 4,561,347 | 12/1985 | Zaitu . |
| 4,603,055 | 7/1986 | Karwowski et al. ............ 426/621 |
| 4,650,685 * | 3/1987 | Persson et al. ............... 426/285 |
| 4,778,690 | 10/1988 | Sadel et al. .................. 426/560 |
| 4,790,996 | 12/1988 | Roush et al. . |
| 4,834,988 | 5/1989 | Karwowski et al. . |
| 4,988,521 | 1/1991 | Fan . |
| 5,026,689 | 6/1991 | Ringe et al. . |
| 5,132,133 | 7/1992 | Huber et al. .................. 426/241 |
| 5,137,745 | 8/1992 | Zukerman et al. . |
| 5,188,860 * | 2/1993 | Hemann et al. ............... 426/560 |
| 5,198,253 | 3/1993 | Roskowiak et al. . |
| 5,338,556 * | 8/1994 | Schwab et al. ................ 426/241 |
| 5,368,870 | 11/1994 | Efstathiou . |
| 5,372,826 | 12/1994 | Holtz et al. . |
| 5,510,130 | 4/1996 | Holtz et al. . |
| 5,520,949 | 5/1996 | Lewis et al. . |
| 5,645,878 | 7/1997 | Breslin et al. . |
| 5,698,252 | 12/1997 | Kelly et al. . |

FOREIGN PATENT DOCUMENTS

| | | |
|---|---|---|
| 668288 | 3/1952 | (AU) . |
| 1050307 | 12/1996 | (GB) . |

OTHER PUBLICATIONS

Hoseney, R.C., Principles of Cereal Science and Technology., 2nd Ed., 1986, pp. 335–342.*
Matz, S., The Chemistry and technology of Cereals as Food and Feed., AVI Publishing, pp.483–490, Jan.,1959*

* cited by examiner

Primary Examiner—Keith Hendricks
Assistant Examiner—Philip DuBois
(74) Attorney, Agent, or Firm—John A. O'Toole; Douglas J. Taylor; Everett G. Diederiks

(57) ABSTRACT

A ready-to-eat cereal based food product such as flakes desirably exhibiting higher numbers of discernible grain fragments of at least 1 mm² is provided, as well as processes for preparing said cereal flakes. By having high numbers of discernible grain fragments the flakes exhibit greater consumer appeal as being less highly processed. More specifically, the ready-to-eat cereal flakes are fabricated from cooked cereal dough having at least 20 discernible grain fragments per gram of flakes. Methods for preparing such flakes including a steeping step of cut grain particles having a particle size of 0.5 to 2.5 mm with warm water to have a moisture content of about 20%, short residence time cooking to form a cooked cereal dough such as in a twin screw extruder, long residence time cooking, forming into pellets, drying the pellets, tempering, flaking the pellets and toasting to form the improved speckled R-T-E flake cereal.

27 Claims, 2 Drawing Sheets

R-T-E CEREAL AND METHOD OF PREPARATION

FIELD OF THE INVENTION

The present invention relates to food products and to their methods of preparation. More particularly, the present invention relates to ready-to-eat breakfast cereals, particularly in flake form and to their methods of preparation.

BACKGROUND

Ready-To-Eat ("R-T-E") cereals are popular packaged goods food items and exist in a variety of forms including flakes, shreds, biscuits and puffed pieces. The present invention provides an improvement in R-T-E cereals especially in flake form.

Conventionally, R-T-E cereals in the form of flakes are prepared by preparing a cooked cereal dough, forming the cooked cereal dough into pellets of desired moisture content, forming the pellets into wet flakes and toasting wet cereal flakes. The toasting causes a final drying, a tenderizing and slight expansion of the R-T-E cereal flakes. The final flake cereal attributes of appearance, flavor, texture, inter alia, are all affected by the selection and practice of the steps employed in their methods of preparation.

Current consumer trends favor more natural appearing foods including R-T-E cereals. For flaked R-T-E cereal products, particularly whole grain multi grain cereals, a flake having the appearance of bits of intact grain pieces are desirable. However, providing such a flake R-T-E cereal product presents numerous difficulties.

To provide flake cereals having this desired appearance feature, one approach is to topically apply cereal bits onto the surface of the flake either prior to toasting or as part of a sugar coating after toasting. However, it would be desirable to have the flake itself exhibit the desired appearance of having discernible grain bits as part of the cereal flake.

Since high shear during cooking tends to destroy grain bit integrity, one technique is to use low shear long residence time batch cookers to prepare a cooked cereal dough. While useful, such machines are expensive. Also, due to their long cooking cycles, the throughput of such cooking machines is low. Current R-T-E cereal production trends increasingly rely upon continuous cooker extruders, especially twin screw extruders to provide faster throughputs.

While cooker extruders are economically desirable due to their high output and short residence or cooking times, and continuous operations features, cooker extruders tend to impart high amounts of shear to the cooked cereal dough formed therein. The high shear tends to destroy the grain piece bit integrity sought herein. The extruder's screw configuration and operating conditions can be selected to minimize the amount of shear imparted to the cereal dough. For example, the extruder can be configured to minimize the amount of time within the extruder and thus to some extent the amount of shear experienced. However, low shear and short extruder residence times can in turn lead to a problem of "white tips" within the cereal dough. White tips are small visually unappealing white spots within the cooked cereal dough which have been incompletely cooked or dispersed within the cereal dough. The problem of white tips is more severe with whole wheat or whole wheat containing cooked cereal doughs as compared, for example, to whole rice.

One attempt at solving the problem of white tips in cooker extruder prepared whole wheat containing cooked cereal doughs is given in U.S. Pat. No. 4,790,996 entitled "Process For Preparing Cereal Products" (issued Dec. 13, 1988 to Roush; et al.). The '996 patent teaches adding a hollow pipe to the discharge end of a cooker extruder to cook the dough more by virtue of an extended residence time thereby reducing white tips.

The present invention provides further advances and improvements in the art of preparing R-T-E cereals especially in flake form containing whole wheat that desirably exhibit discernible grain bits. The R-T-E cereals exhibit minimal white tips and have low imparted shear to the cooked cereal dough from which they are prepared.

The present improvements reside in part in the steeping of the cereal grains under particular conditions prior to being formed into a cooked cereal dough in a cooker extruder. After being formed into a cooked cereal dough, the dough is subjected to a step within a second, low shear extended residence time cooker.

SUMMARY OF THE INVENTION

In its principle method aspect, the present invention provides methods of preparing a flaked R-T-E cereal of enhanced appearance having discernible grain bits. The R-T-E preparation methods comprise the steps of:

A. providing free cereal grain pieces having a particle size of about 0.5 to 2.5 mm and having a moisture content of at least 20%;

B. forming the grain pieces into a cooked cereal dough in a cooker extruder under conditions of low shear sufficient to provide a cooked cereal dough having discernible grain bits, said forming step including adding sufficient amounts of moisture to provide the cooked cereal dough with a moisture content of about 22 to 35%;

C. immediately thereafter, subjecting the cooked cereal dough to a second cooking step at a temperature of about 121 to about 180° C. (250 to 380° F.) for about 20 to 45 minutes to form an extended cooked cereal dough having discernible grain bits dispersed therein;

D. forming the cooked cereal dough in pellets each weighing about 0.25 to 10 g;

E. drying the pellets to a moisture content of about 18 to 22%;

F. flaking the pellets to form wet flakes having a moisture content of about 16 to 20% and a thickness of 380 to 840 $\mu$m (0.015 to 0.035 in); and G. toasting the wet flakes to form a toasted R-T-E cereal having a moisture content of about 2 to 4% and having discernible grain bits dispersed therein.

In its R-T-E product aspect, the present invention resides in products prepared by the present methods. The products are characterized as flake R-T-E cereal products having discernible grain fragments at least 1 mm$^2$ in area in the amount of at least 30 per gram of flakes.

In another product aspect, the present invention resides in cooked cereal doughs intermediate products useful in the preparation of R-T-E cereal and grain based snack products. The cooked cereal doughs comprise about 50 to 79% whole grain cereal ingredients, about 21 to 35% moisture and having discernible grain fragments at least 1 mm² in area in the amount of at least 30 per gram.

DETAILED DESCRIPTION OF THE INVENTION

The present invention provides improved flaked cereals of enhanced appearance and further provides methods for preparing such improved flaked cereals.

Throughout the specification and claims, percentages are by weight unless otherwise indicated.

Steeping a Raw Premix Including Cereal Grain Pieces

Figure 1:
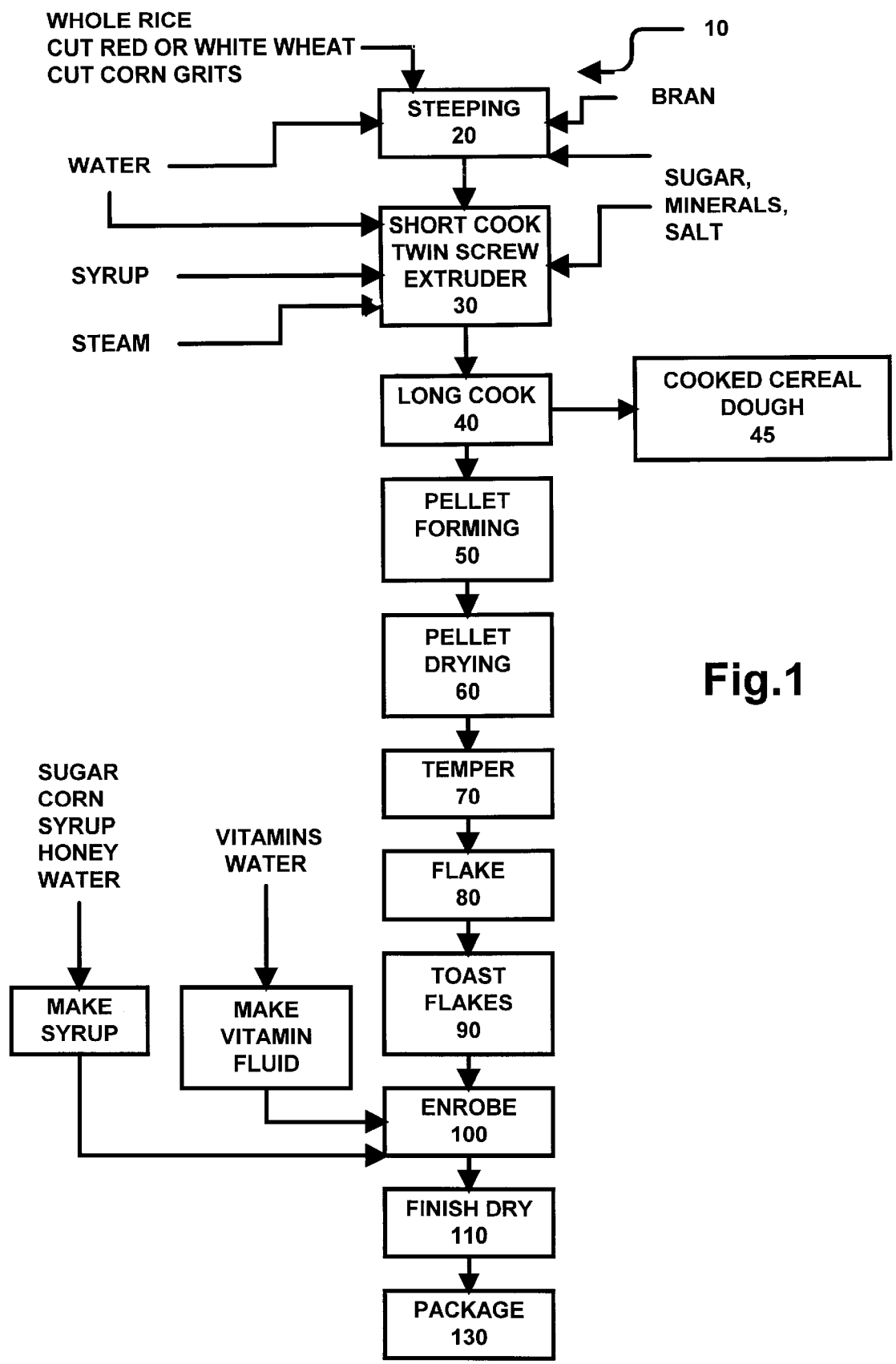
FIG. 1 is a simplified flow diagram of the present process for preparing R-T-E cereals.

Referring now to the drawing, FIG. 1 illustrates a process according to the present invention generally indicated by reference numeral 10. Further, the drawing illustrates that the present methods 10 essentially comprise a first step of 20 of providing free cereal grain pieces having a moisture content of at least 20%, preferably about 20 to 30% moisture.

This step can include a first substep of preparing a cereal premix comprising at least one, preferably at least two grain ingredients selected from the group consisting of wheat, corn (maize), oats, rye, triticale and mixtures thereof.

In a preferred variation, at least a portion of the cereal grains are "raw." By "raw" is meant, of course, uncooked or ungelatinized cereal grains.

Also, the grain ingredients are further essentially characterized by a particle size of generally less than a whole grain but essentially as being larger than a flour or semolina. Thus cut grains are essentially characterized by a particle size of about 0.5 to 2.5 mm in length, preferably about 1 to 2 mm in length. Wheat grain pieces within this particle size are provided by, for example, cut grains into two to four pieces, i.e., one-half, one-third or one-quarter berries, collectively "cracked berries." Such a size selection is important to obtaining the grain bit integrity feature while at the same time ensuring complete cooking of the cereal so as to avoid white tips.

If desired, the cereal premix can additionally further include a rice ingredient. Surprisingly, the rice ingredient can by supplied in whole or in part by a whole piece or uncut rice grain. In less preferred embodiments, all or a portion of the corn (maize) ingredients can be supplied by corn cones. In the preferred embodiment at least one grain ingredient is supplied by a whole grain piece or bit including the germ and bran fractions thereof.

If desired, supplemental nutritive carbohydrate sweeteners can be additionally included into the blend. Such sweeteners can comprise, for example, sucrose, fructose, glucose, corn syrup, honey, maple syrup solids, fruit juice solids, and mixtures thereof. If present, such nutritive carbohydrate sweeteners can collectively comprise about 0.1 to 25% of the cooked cereal dough (dry basis).

The present cereal compositions can additionally comprise a variety of other minor ingredients intended to make the cereal compositions nutritionally, organoleptically or visually appealing. Such materials can include, for example, vitamins, mineral fortifiers, salt, colors, and flavors, flavor enhancers, and mixtures thereof. If present, these materials can each comprise from about 0.1 to 2% by weight of the composition. Conventionally, these dry materials are in powder form. As FIG. 1 illustrates by a narrow addition arrow, the premix can include all or a portion of these materials with the balance, if any, being added to the first cook step 30 described below.

Especially preferred for use herein is trisodium phosphate ("TSP") which serves as a pH buffering agent. Useful concentrations of TSP range from about 0.1 to 0.5%.

One especially useful material is common salt. Desirably, the salt comprises about 0.1 to 4%, preferably about 0.5 to 1.0% of the cereal composition.

The first step 20 can optionally include a second substep of admixing the grain ingredients with all or a portion of the optional dry optional ingredients to form a dry cereal premix blend in a conventional mixer such as a ribbon mixer.

Good results are obtained from a premix blend comprising (dry weight basis):

| Ingredient | Amount Weight % | Preferred Weight % | Most Preferred Weight % |
| --- | --- | --- | --- |
| White wheat | 0 to 100% | 5 to 50% | 15 to 25% |
| Red wheat | 0 to 100% | 15 to 60% | 20 to 40% |
| Corn grits | 0 to 100% | 10 to 60% | 20 to 40% |
| Whole rice | 0 to 100% | 10 to 60% | 20 to 40% |
| Bran | 0 to 30% | 8 to 20% | 10 to 15% |

Of course, single grain variations can be employed, e.g., all corn or all wheat products.

The essential grain ingredients are characterized by an initial moisture content, typically about 12 to 14%.

This first step can further comprise the substep of admixing sufficient amounts of water and/or moisture containing ingredients to provide the preblend with a moisture content of at least 20% to about 30%, preferably 20 to 28%. Preferably, the added water is added as hot water in order to reduce the steeping time required for equilibration.

By "hot" herein is meant a temperature of at least 65° C. (150° F.), preferably a temperature ranging between 65 to about 88° C. (150 to about 190° F.). The admixing and steeping steps can be conveniently practiced in a conventional mixer such as a ribbon blender.

Next, step 20 can include the substep of equilibrating or steeping the wetted admixture until the added moisture is uniformly absorbed. Good results are obtained when the steep step includes equilibration times ranging from about 15 to 45 minutes, preferably about 25 to 35 minutes.

In the preferred embodiment, this steeping substep is practiced with gentle but sufficient agitation so as to prevent agglomeration or the formation of clumps. Good results are obtained with intermittent agitation such as a repeated cycle of 1–2 minutes of gentile agitation followed by 6–12 minutes of quiescence. This cycle can be repeated for about 15 to 30 minutes until the moisture is absorbed to form steeped or wetted cereal premix.

The high moisture grain blend, with or without added ingredients, is desirably provided in "free" form. By "free" is meant in discrete pieces without excessive clumping of the grain pieces together so that the grains can be fed to the twin screw extruder in the next step.

In a preferred variation, the step does not involve further heating or cooking of the wetted grains. For example, the steeped preblend is not exposed to direct or indirect steam heating. As a result, the grains, although of higher moisture content, are not fully hydrated and are substantially ungelatinized, i.e., less than 5% of the starch is gelatinized.

As illustrated in FIG. 1, in high fiber variations, the steeped cereal premix can further include a bran fraction ingredient such as bran from wheat, rice, oat, corn and mixtures thereof. In less preferred variations, non cereal fiber ingredients can be added, e.g., psyllium. In even more preferred high fiber variations, the premix includes sufficient amounts of the bran ingredient to provide the cooked cereal dough with a total fiber level, including that supplied by the grain ingredients, of about 3–6 g fiber per ounce (dry weight) of fiber (including both soluble and insoluble fiber). Preferably, the supplemental bran ingredient(s) is added to the mixer after substantially completing the steeping of the grain. In minor variations of this high fiber embodiment, all or a portion of the bran ingredient(s) can be added to the twin screw extruder in the cooking step 30.

Forming The Steeped Preblend Into A Cooked Cereal Dough

The present methods essentially comprise a step of forming 30 the steeped preblend or high moisture free grain pieces so prepared into a cooked cereal dough. This first cooking step 30 is practiced in a short time under conditions of low shear sufficient to provide a cooked cereal having discernible grain bits.

As is described in those references and is more well known, a cooked cereal dough can be prepared in many ways by blending or admixing various cereal ingredients together with water and cooking to gelatinize the starchy components and to develop a cooked flavor. The cooked material can then be mechanically worked to form a cooked cereal dough.

In the present cooking step 30, the cereal is cooked with steam and sufficient amounts of added water for times and at temperatures sufficient to gelatinize the cereal starch and to provide the cooked cereal dough with a moisture content essentially ranging from about 21 to 35%. In addition to water, various liquid ingredients such as corn (maize) or malt syrups can be added. The malt syrup flavor ingredient comprises about 1 to 8% (dry basis), preferably about 2 to 5%. Supplemental sugar can be added to the syrup, if desired. However, the total sugar content of the cooked cereal dough should be less than 25%, preferably less than 12% (dry weight). For certain product variations, vegetable oil or other fat or equivalents (e.g., olestra or other sucrose polyesters) can be added to the twin screw extruder.

A twin screw extruder can be used to practice this first cooking step of the present invention. A twin screw extruder can perform the mixing, heating/cooking and dough forming steps all in a single piece of equipment. As a result, a twin screw extruder provides the advantage of a practical and commercially economical technique for practicing the invention. While single screw cooker extruders are known, some of which include preconditions, single screw cooker extruders generally impart too much shear to the cooked cereal dough resulting in the undesirable loss of the bit identity in the present R-T-E cereals.

As indicated above, if desired, however, all or a portion of some or all of the optional dry ingredients can be added to the twin screw extruder for admixture into the cooked cereal dough.

The twin screw extruder is configured to provide a short cook time, namely, a residence time on the order of one to three minutes, preferably about two minutes. Also, the extruder is configured to minimize the amount of shear imparted to the cooked cereal dough. The present working step is practiced to impart extremely low Specific Mechanical Energy ("SME") to the grain based material. As its name implies, SME is used to characterize the amount of mechanical energy or work that the extruder imparts to the material being worked. Conventional twin screw extruder cooking imparts about 90 to 150 W-hr./kg. (or, equivalently, 0.09 to 0.15 kW-hr./kg.) of SME to the cooked cereal dough. The present invention is practiced so as to impart less than 30 W-hr./kg. of SME to the grain based product, preferably about 0.5 to 20 W-hr./kg. of SME.

The temperature of the cooked cereal dough can range from about 250 to 380° F. The operating pressure can range from about 690 to 8300 kPa (100 to 1200 PSI), preferably 2860 to 3200 kPa. (400 to 750 PSI).

The cooked cereal doughs, immediately after the first cooking step 30, typically will have a moisture content of about 21 to 35% by weight, preferably about 28 to 32% and for best results about 29 to 30%. The cooked cereal doughs are for all practical purposes completely gelatinized, i.e., a starch gelatinization of at least 95%, preferably 99%, as measured by differential scanning calorimetry.

Subjecting The Cooked Cereal Dough To A Second Cooking Step

The present methods 10 further essentially comprise immediately thereafter, the step of subjecting the cooked cereal dough having a moisture content of about 21 to 35% to a second long cooking step 40 at a temperature of about 121 to about 180° C. (250 to 380° F.) for about 15 to 45 minutes to form an extended cooked cereal dough having discernible grain bits dispersed therein.

By "immediately thereafter" herein is meant without an intervening step such as an extrusion, conveying, or holding steps or exposure to atmospheric conditions. Such "immediately thereafter" processing can be conveniently accomplished by a short direct piping connection from the twin screw extruder discharge to the second cooking device with no intervening die plate or other shear imparting equipment. Such further shear would diminish the intact grain bit feature that is the object of the present invention.

In more preferred variations the step 40 is practiced in a manner further characterized by no venting or loss of moisture from the dough. In even more preferred variations, no further additions of materials to the cooked cereal dough are made.

A cooking device suitable for use herein to practice the second cooking step is a double jacketed horizontally extending cylindrical vessel including internal transporting means such as an Archimedes screw. Such a device is described, for example in the published Australian patent application 95 34,340 entitled "Manufacture of Cooked Cereals" and which is incorporated herein by reference.

While not critical per se, the cooking device described employs a rotational speed of about 1–10 rpm.

The residence time of the cooked cereal dough with the second cooking device ranges from about 15 to 45 minutes, preferably about 15 to 25 minutes.

Although the vessel therein described can be operated to provide supplemental heating, in the preferred operation of the present methods, no supplemental heat is supplied.

The cooked cereal dough entering the second cooking step is in the preferred embodiment essentially fully gelatinized. The second cooking step is employed primarily for flavor development.

Due to the slow rotational speed and the nature of the screw configuration, extremely low shear is imparted to the cooked dough during the second cooking step due to vessel construction and operation.

The dough exiting has a more fully developed flavor, exhibits few, if any white tips, but nonetheless retains a desirable number of discernible grain bits.

Since no moisture loss during the second cooking step, the moisture content ranges from about 21 to 32%, preferably about 27 to 30%.

The cooked cereal 45 so formed is essentially characterized by about 50 to 79% whole grain cereal ingredients, about 21 to 35% moisture and having discernible grain fragments at least 1 mm$^2$ in area in the amount of at least 29 per gram. While the following description is particularly addressed to the provision of flaked R-T-E cereals and to grain based snack food products fabricated from cooked cereal doughs, the novel cooked cereal doughs are useful intermediate products in the preparation of a variety of food products.

Forming The Cooked Cereal Dough Into Pellets

The present methods 10 further essentially include the step of forming 50 the cooked cereal dough into suitably sized and shaped pellets. In one preferred variation, step 50 can include the first substep of extruding the cooked dough through a die plate having a plurality of dies to form extrudate ropes. For example, a die plate having a 2 to 10 inch diameter can be fabricated to have about 5 to 50 dies, each about 3 mm to 20 mm in diameter. A larger die is preferred since larger dies develop less back pressure and less back pressure results in less shear.

In the preferred variations, step 50 can then further include the second substep of sectioning the ropes such as using a rotating knife to form individual pellets each weighing about 0.25 to 10 g.

The process 10 generally, and the pellet forming step 50 in particular, is practiced under temperatures and pressures such that no significant puffing or direct expansion occurs.

In other, less preferred variations, the pellet forming step 50 can be practiced using known low shear methods and techniques can be used to form the cooked cereal dough into pellets. For example, a briquette forming apparatus (such as is available from K. R. Komarek Inc.) or pelletizer available from LCI Corporation). However, it is important herein not to feed the dough into a high shear pellet former as is conventionally practiced. The skilled artisan will be able to distinguish between an acceptable low shear pellet forming apparatus and an unsuitable high shear pellet forming apparatus by the saving or loss of the grain bit identity in the pellets. Conventional high shear forming extruders subject the cooked cereal dough to shear resulting in loss of the desirable bit integrity herein.

Drying The Pellets

Thereafter, the present R-T-E cereal preparation methods 10 essentially comprise the step of drying 60 the pellets prior to the flaking step 80 to provide dried pellets having a moisture content of about 16 to 22%, preferably 18 to 20%.

Conventional drying techniques and apparatus can be used to practice the present drying step. Conveniently, the pellets are subjected to a forced hot air drying step with air temperatures of 82.2 to 121.1° C. (180 to 250° F.) until within the desired moisture content range. Typical drying times range from 10 to 20 minutes, preferably about 15 minutes.

Tempering the dried pellets

Thereafter, the present methods 10 in preferred embodiments further include the step of tempering 70 the dried pellets for about 30 to 90 minutes to form tempered dried pellets. The tempering step 70 allows the moisture to equilibrate within the pellets or, in less preferred embodiments, the pellets are formed into flakes without the preferred tempering step.

Conveniently, one or more slow moving belts can be used to provide the requisite holding or temper time. Preferably, the belts are covered to prevent contamination of the pellets. Of course, as the pellets are exposed to ambient conditions, the pellets will cool and lose some moisture.

Flaking

The present R-T-E cereal methods 10 further essentially comprise the step of flaking 80 the dried, preferably tempered pellets to form so-called "wet" flakes having a thickness ranging from about 380 to 840 microns (0.015 to 0.035 in). Conventional flaking rolls can be used to practice this step. Preferred for use are flakes having a thickness of about 380 to 840 $\mu$m (0.15 to 0.35 in.) and more preferably about 508 to 762 $\mu$m (0.020 to 0.030 inch). The wet flakes have a moisture content of about 17 to 19%.

Moreover, it is preferable that the present flaking step include a pellet heating substep (not shown) prior to the flaking step in order to assure that the pellets are at a temperature of about 71 to 77° C. (150 to 180° F.) immediately prior to the flaking step. Such preheating ensures that the pellets are at a temperature suitable for the subsequent flaking step.

Toasting

Thereafter, the present methods 10 further essentially comprise the step 90 of toasting the wet flakes to form toasted, dried R-T-E cereal flakes having an enhanced appearance.

A flake cereal is tenderized, toasted and partially expanded by rapid heating of wet flakes which converts the dense, hard, wet flakes into more palatable, porous, tender flakes. The toasting operation also enhances the color and flavor of the finished cereal product. Toasting can be accomplished by heating the wet flakes, usually to 93.3 to 315.5° C. (200 to 600° F.). Toasting of the R-T-E cereal pieces can be practiced in conventional dryers, vacuum dryers or other commercial baking equipment. Preferably, the wet flakes are toasted, preferably between 148.8 to 315.5° C. (300 to 600° F.) until a moisture content of approximately 2 to 5% is obtained. While not critical per se, such toasting typically requires heating for about three to 10 minutes.

The improved finished R-T-E cereals herein are essentially free of white tips, display discernible cereal bit pieces within the flakes, poses good flavor and exceptional eating qualities.

The R-T-E flakes are further essentially characterized by having discernible grain fragments at least 1 to 2 mm$^2$ in area in the amount of at least 29 per gram of flakes preferably at least 35/g flakes, and most preferably at least 40/g of flakes. In more preferred embodiments, the flakes (before sugar coating) are further characterized by a bulk density of about 100 to 180 grams per liter. While other sugar coated variations are described below, the measurement of the bit appearance feature is best made prior to the application of any such sugar or presweetener coating.

Thereafter, the finished dried flaked R-T-E cereal of the present invention can be conventionally packaged and distributed. The finish R-T-E cereal exhibits enhanced consumer appeal by virtue of the more natural appearance of the cereal flakes and a greater bit piece identity.

Of course, the cooked cereal dough can also be fabricated into other suitable R-T-E cereal shapes such as shreds, shredded biscuits, mini shredded biscuits, biscuits sheeted squares, and the like.

If desired, the toasted flakes can be subjected to a screening or scalping step (not shown) to remove all or a portion of the fines or other size separation step to further decrease the bulk density.

Presweetener Topical Coating

FIG. 1 further illustrates that, if desired, the present methods 10 can further include the step of providing a presweetener or sugar coating to the finished R-T-E cereal flakes. Providing a sugar coating can involve the substeps of forming a sugar coating or presweetening syrup or slurry and enrobing 100 or otherwise applying a presweetener coating syrup or slurry to the flakes to form slurry coated flakes. In the practice of this step, flakes can be charged to an enrober and a topical presweetener coating (4 to 20% moisture) is applied thereto. In a preferred variation employing conventional nutritive carbohydrate sweeteners, the slurry moisture content can range from about 5 to 20% sugar(s) and optionally modest quantities of oil (e.g., 1 to 10%). Sufficient amounts of sugar coating are applied to provide the R-T-E cereals with a sugar coating to cereal base ranging from about 2:100 to about 50:100 (dry basis).

If desired, heat sensitive vitamins can be added to or with the sweetener coating slurry.

Thereafter, the slurry coated R-T-E cereals can be and the step 100 can further include the substep of finish drying 110, prior to packaging at 130 to remove the moisture added by the sugar coating slurry to provide sugar coated finished flaked R-T-E cereals having a moisture content of about 2 to 5%. In variations that involve applying a low moisture sugar coating solution, the finish drying step might not be necessary.

It will be appreciated that addition of a sugar coating will substantially increase the bulk density of the flaked R-T-E cereals. Sugar coated flaked R-T-E cereals of the present invention have a bulk density of about 134 to 183 gram per liter (220 to 300 g/100 in$^3$).

In other variations, all or a portion of the nutritive carbohydrate sweeteners can be substituted with high potency sweeteners such as aspartame at equivalent sweetness levels.

In other variations, the finish R-T-E cereal flakes, whether or not presweetened, can be admixed with a variety of added ingredients such as raisins, nuts, marbits, dried fruit pieces, and mixtures thereof. Of course, the addition of such relatively heavy added ingredients will tend to produce blended R-T-E cereal products having higher bulk densities.

As noted above, while the present invention is directed primarily towards the provision of flaked R-T-E cereals fabricated from the present cooked cereal doughs, the skilled artisan will appreciate that the present cooked cereal doughs are useful intermediate products that can also be used to provide a wide variety of grain snacks and other R-T-E cereal products.

Figure 2:
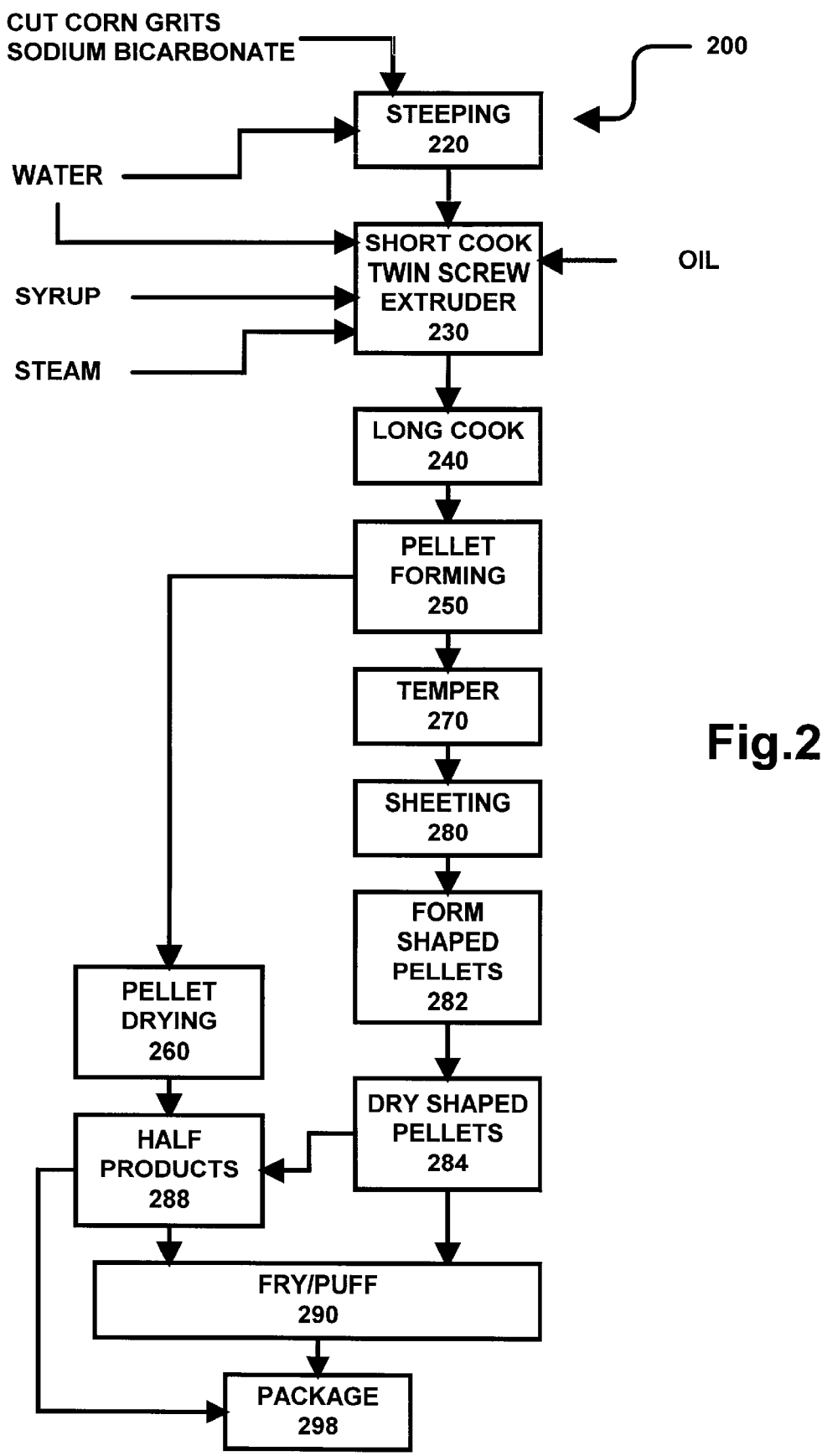
FIG. 2 is a simplified flow diagram of an embodiment of the present invention for the fabrication of snack products.

Referring now to FIG. 2, there is shown an embodiment of the present invention for the preparation of a grain based food product generally designated by reference number 200. FIG. 2 depicts the preparation of a cooked cereal dough, e.g., for a corn (maize) based snack product. This snack preparation process includes a steeping step 220, a short cook step 230 in a twin screw extruder and a long cook step 240. These steps are generally practiced as described above.

In one variation, the pellet forming step 250 is practiced to provide suitable shaped and sized pellets. The process can then further comprise drying the pellets 260 to form dried pellets having a moisture content of about 7 to 14% by weight. These pellets or half products 288 are then suitable for use as an intermediate product in the fabrication of finished snack pieces. As such, the pellets can be packaged 298, for example, in large carton totes. Conveniently, the half product pellets can be fabricated in a single large scale production facility. Due to their shelf stability, the pellets can be shipped from the central manufacturing location to a wide variety of finish operations. The half products, being unpuffed, are more convenient to transport. Not only are the pellets of lower volume, but also are less subject to damage in transit. When the pellets are shipped closer to the final market, the pellets can then be fried to form the finished fried, puffed snack pieces.

Process 200 can further include finishing step for forming the half products or pellets into a finished grain based snack. For example, the pellets can be expanded and dried by deep fat frying to provide puffed, fried grain based snack products having a moisture content of under 2% and a fat content of about 1 to 35%, preferably about 15 to 35% by weight (for example when prepared by deep fat frying).

The snack pieces fabricated from the cooked cereal doughs herein can then be, if desired (not shown), further seasoned by the topical application of salt, flavors, dried cheeses and packaged for distribution and sale.

The finished puffed snacks can then be packaged 298 in conventional manner.

In another variation, the cooked cereal dough is formed into pellets ranging in size from about 0.3 up to about 10 gram.

Thereafter, process 200 comprises tempering 270 the pellets for about two to 30 minutes. The pellets are cooled to about 140 to 180° F. (60 to 82° C.) and to allow equilibration of the moisture.

In addition to the temper belts described above, equivalent tempering methods can be used. For example, preumatic conveying of the pellets from the pellet forming step to the next step can serve as the tempering step provided the requisite moisture equilibration and cooling occurs.

Thereafter, in this variation of the process for preparing snack products, the process 200 further comprises the step of sheeting 280 the tempered pellets to form, in the preferred embodiment, continuous rolls of sheeted dough. Thereafter, optionally, the sheeting step can further include the substep of (not shown) cutting the sheets to form individual strips or ribbons of sheeted dough.

The sheeted dough, in certain variations, is folded to form two-ply ribbons or dough strips.

FIG. 2 depicts that process 200, in the preferred embodiment, can further include forming the strips or ribbons, whether single or double ply, into suitably shaped and sized pellets 282. For example, biscuits, spirals, cornucopias, figurines and various geometric shapes.

The shaped pellets so formed, are then dried at 284 to form half products 288.

The half products can be fried, air puffed or otherwise formed 290 into finished snack products. After topical seasoning, if desired, the so formed finished snack products of the present invention can be conventionally packaged for distribution and sale.

The snack products so formed exhibit desirable organoleptic attributes, especially eating quality. Preferred snack products further exhibit the desirable discernible grain bit integrity advantage. However, when single grain cooked cereal doughs are employed, e.g., only corn (maize), then the discernible grain bit feature is less apparent.

The invention is illustrated by the following example.

EXAMPLE 1

A multi-grain flake R-T-E cereal of the present invention is prepared. Initially, four grains are steeped before being added to a twin screw extruder cooker. The granulation of the four grains is as follows:

Corn grits: 3% on a 2.0 mm screen, 90% on a 1.4 mm screen and 2% through a 1.00 mm screen.

Cut red wheat and white wheat: 22% on a 2.0 mm screen, 15% on a 1.4 mm screen, 6% through a 0.85 mm screen.

Rice medium grain whole, uncut grain. All four grains are added to a ribbon blender. Water (heated to a minimum of 65.5° C.; 150° F.) is added to the blender at a water:grains ratio of 1:6.7. The grain/water mixture is mixed for five minutes, then allowed to rest, as the water soaks into the grains, for 10 minutes. The mixture is then mixed for one minute to prevent the water from settling on the bottom. The mixture is then left again for 10 minutes, mixed for one minute, left for 10 minutes, and mixed for one minute. After that time, the mixture is jogged for a few seconds every 10 minutes to prevent the mixture from compacting until the time at which the mixture needs to be sent to the twin screw extruder cooker. At that time, the steeped grains (at 20% moisture) are added to the cooker in the following formulation:

| Ingredients | Weight % |
|---|---|
| Steeped grains | 83.6% |
| Whole rice | 25.1% |
| Corn grits | 16.7% |
| Cut red wheat | 25.1% |
| Cut white wheat | 16.7% |
| Sugar syrup | 15.5% |
| Sugar | 5.1% |
| Tricalcium Phosphate | 0.2% |
| Salt | 0.8% |
| Water | 6.2% |
| Annatto color | 0.02% |
| Trisodium Phosphate | 0.05% |
| Corn Syrup | 0.8% |
| Malt syrup | 2.3% |
| Vitamin/Emulsifier Blend | 0.9% |
| Vitamin Blend | 0.07% |
| Emulsifier | 0.8% |
| | 100.0% |

The emulsifier is a processing aid designed to prevent sticking of the formed pellets. Water is added to the twin screw extruder cooker at a water: steeped grain ratio of 1:15. Steam is added to the twin screw extruder cooker at a steam:steeped grain ratio of 1:7.5. The residence time in the cooker is 2–5 minutes. The temperature is 135 to 146° C. (275 to 295° F.). The pressure at the die (or the end) of the cooker is 400 to 450 psi (2861 to 3200 KPa). The screw speed is 100 rpm. The configuration of the screw elements are low shear.

The cooked dough goes into a second long residence time cooking vessel where the dough continues to cook for 20 to 30 minutes. The screw rotational speed is 1 rpm. The exit temperature is 121 to 126.6° C. (250 to 260° F.).

The dough then goes through a short discharge pipe having a die and cutter assembly. The die contains 12 holes, all ½" diameter (13 mm). The cutter contains two blades.

The dough is extruded into ropes that are sectioned into pellets having a pellet count of about 30 pellets per 10 g. The pellets contain visual grains but no uncooked grains (white tips). Their moisture is 30%.

The pellets are conveyed to a dryer where they are dried at 87.8° C. (190° F.) for 15 minutes to 20% moisture. These dried pellets are then conveyed on two separate temper belts for a total of 60 minutes. This tempering allows the moisture to equilibrate throughout the pellets and helps to make the finished flakes more curly. The tempered pellets go through flaking rolls. The pellet temperature is 71° C. (160° F.). The flake thickness is 0.025".

These flakes then enter a three zone toaster. The first zone temperature is 221° C. (430° F.), the second and third zone temperatures are 165.5° C. (330° F.). The density of the flakes is 120 g/L.

Procedure to count large pieces of grain visible in flaked cereals.

The samples of cereal were analyzed to determine the amount and distribution of large pieces of individual grains visible within each flake. Fifty flakes from each sample were examined under a bright light. The intact pieces of grain, larger than 1 square mm, were counted for each flake. The pieces of wheat were visible most often because of the bran layer and underlying white endosperm while the rice pieces were white and looked like a fine white foam. The corn pieces were bright yellow. Statistical analysis was performed on the data collected.

The present R-T-E cereal flakes have about 33 discernible bits per gram. For comparison, R-T-E flakes prepared from the similar materials under like conditions except wherein the grains are a smaller granulation and are not steeped but added directly to the twin screw extruder exhibit only about seven discernible bits per gram. This second method is an alternative way to prevent white tips. However, the result is less of the visual effect of the grains. The results of this testing demonstrate the importance and unexpected advantage of the present methods that essentially include the steeping step.

The toasted flakes are then coated with a sugar slurry having the following formulation:

| Ingredients | Weight % |
|---|---|
| Sucrose | 48.00 |
| Corn syrup | 2.7 |
| Honey | 7.7 |
| Moisture | 40.7 |
| | 100.00% |

About 5 g of the slurry and 0.3 g of vitamin solution (40% dry vitamin blend, 60% water) were added per 100 g of toasted flakes to form coated flakes. The sugar slurry was preheated to about 82.2° C. (180° F.) and the vitamin solution mixed in just prior to application to the toasted cereal flakes.

The coated cereal flakes were dried at a bed depth of about 6 cm in a fluidized toasting oven at 96° C. (205° F.) for about 20 minutes and are dried to a moisture content of about 2.5% to form finished dried coated R-T-E cereal flakes of the present invention. The R-T-E cereal is then conventionally packaged and distributed.

What is claimed is:

1. A method of preparing a R-T-E cereal based food product of enhanced appearance having discernible grain bits, comprising the steps of:

A. providing cereal grain pieces having a particle size of about 0.5 to 2.5 mm and a moisture content of at least 20%;

B. forming a cooked cereal dough from the grain pieces in a cooker extruder to produce a cooked cereal dough having discernible grain bits from the cereal grain pieces of step A, said forming step including adding sufficient amounts of moisture to provide the cooked cereal dough with a moisture content of about 21 to 35%;

C. immediately thereafter, subjecting the cooked cereal dough to a second cooking step at a temperature of about 121 to about 180° C. (250 to 380° F.) for about 15 to 45 minutes to form an extended cooked cereal dough having the discernible grain bits of at least 1 mm$^2$ in area dispersed therein.

2. The method of claim 1 additionally comprising the steps of:

D. forming the cooked cereal dough into pellets each weighing about 0.25 to 10 g; and E. drying the pellets to a moisture content of about 7 to 22%.

3. The method of claim 2 additionally comprising the steps of, flaking the pellets and, after drying the pellets and before flaking:tempering the dried pellets for about 30 to 90 minutes to form tempered dried pellets;

flaking the pellets to form wet flakes having a moisture content of about 16 to 20% and a thickness of 380 to 840 μm (0.015 to 0.035 in); and, toasting the wet flakes to form a toasted R-T-E flake cereal having a moisture content of about 2 to 4% and having discernible grain bits dispersed therein.

4. The method of claim 1 wherein step A comprises the substeps of:

preparing a raw cereal premix comprising at least two grain ingredients selected from the group consisting of wheat, corn (maize), oats, rye, triticale and mixtures thereof and wherein at least the wheat is provided in the form of cracked berries; and admixing sufficient amounts of water and/or hot moisture containing ingredients to provide the preblend with a moisture content of about 20 to 25%.

5. The method of claim 1 wherein the cereal grain includes corn.

6. The method of claim 1 wherein in steps B and C are practiced to provide the dough with a Specific Mechanical Energy ("SME") value of less than 30 watt-hours/kg of dough.

7. The method of claim 4 wherein the raw premix additionally includes a bran ingredient.

8. The method of claim 6 wherein the cooked cereal dough includes sufficient amounts of nutritive carbohydrate ingredients to provide a total sugar content of about 1 to 25% (dry weight).

9. The method of claim 7 wherein at least a portion of the bran is supplied by white wheat bran.

10. The method of claim 6 wherein the dough includes a member selected from the group consisting of sugar(s), salt, minerals, vitamins, flavor and mixtures thereof.

11. The method of claim 10 wherein step A includes a steeping substep performed with intermittent agitation.

12. The method of claim 3 whereby said toasted R-T-E flake cereal having the discernible grain bits in the amount of at least 30 per gram of flakes.

13. The method of claim 12 wherein Step B is practiced in a twin screw extruder and has a duration of about 1–3 minutes.

14. The method of claim 13 wherein step C is practiced in a cooker having an Archimedes screw operated at about 1–10 rpm for about 15 to 45 minutes.

15. The method of claim 14 additionally comprising the step of applying a topical presweetener coating.

16. The method of claim 15 wherein the weight ratio of topical presweetener coating to cereal flake ranges from about 2:100 to 50:100.

17. The method of claim 14 additionally comprising a dried pellet heating step prior to flaking.

18. The method of claim 17 comprising about 0.1 to 2% salt.

19. The method of claim 14 wherein the finished flake has at least 35 discernible bits of at least 1 mm$^2$ per grain.

20. The method of claim 1 wherein the grain includes corn (maize).

21. The method of claim 19 wherein the cooked cereal dough has a total fiber content of at least 3 g/oz.

22. The method of claim 1 additionally comprising the step of forming the cooked cereal dough into pellets and subsequently forming the pellets into finished grain based snacks.

23. The method of claim 22 wherein the forming step includes rapidly heating the pellets to provide puffed finished grain based snacks.

24. The method of claim 23 wherein the rapid heating includes deep fat frying to provide fried puffed grain based snacks having a fat content of about 15 to 35% by weight.

25. The method of claim 24 wherein the rapidly heating includes microwave heating.

26. The method of claim 20 wherein in step B, the cooked cereal dough includes about 1 to 10% (dry weight basis) of an edible fatty triglyceride.

27. A method of preparing a R-T-E cereal based food product of enhanced appearance having discernible grain bits, comprising the steps of:

A. providing a steeped raw premix including cereal grain pieces with added water with agitation and to provide an uncooked premix comprising steeped grain pieces having a moisture content of at least 20%;

B. forming a cooked cereal dough from the cereal grain pieces in a cooker extruder to produce a cooked cereal dough having discernible grain bits from the cereal grain pieces of step A, said forming step including adding sufficient amounts of moisture to provide the cooked cereal dough with a moisture content of about 21 to 35%;

C. immediately thereafter, subjecting the cooked cereal dough having a moisture content of about 21 to 35% to a second cooking step at a temperature of about 121 to about 180° C. (250 to 380° F.) for about 20 to 45 minutes to form an extended cooked cereal dough having the discernible grain bits of at least 1 mm$^2$ in area dispersed therein;

D. forming the cooked cereal dough in pellets each weighing about 0.25 to 10 g;

E. drying the pellets to a moisture content of about 7 to 14%.

* * * * *